United States Patent
Liao et al.

(10) Patent No.: US 7,856,598 B2
(45) Date of Patent: Dec. 21, 2010

(54) SPELLING CORRECTION WITH LIAOALPHAGRAMS AND INVERTED INDEX

(75) Inventors: Ciya Liao, Mountain View, CA (US); Shamim A. Alpha, Foster City, CA (US)

(73) Assignee: Oracle International Corp., Redwood Shores, CA (US)

( * ) Notice: Subject to any disclaimer, the term of this patent is extended or adjusted under 35 U.S.C. 154(b) by 1202 days.

(21) Appl. No.: 11/481,750

(22) Filed: Jul. 6, 2006
(Under 37 CFR 1.47)

(65) Prior Publication Data
US 2008/0010316 A1    Jan. 10, 2008

(51) Int. Cl.
*G06F 17/00* (2006.01)
*G06F 17/20* (2006.01)
*G06F 17/21* (2006.01)
*G06F 17/22* (2006.01)
*G06F 17/24* (2006.01)
*G06F 17/25* (2006.01)
*G06F 17/26* (2006.01)
*G06F 17/27* (2006.01)
*G06F 17/28* (2006.01)

(52) U.S. Cl. ............................. 715/257; 704/9; 704/10

(58) Field of Classification Search ................. 715/257; 704/10, 4, 9
See application file for complete search history.

(56) References Cited

U.S. PATENT DOCUMENTS

2006/0212265 A1 * 9/2006 Amitay et al. .............. 702/182
2007/0022109 A1 * 1/2007 Imielinski et al. .............. 707/4

OTHER PUBLICATIONS

Mustafa, Suleiman, "Character contiguity in N-gram-based word matching: the case for Arabic text searching" 2004 Elsevier Ltd., p. 819-827.*

Angell et al., Auto. Spelling Correc. Using a Trigram Similarity Measure, Info. Proc. & Mgmt. vol. 19, #4,pp. 255-261, 1983,Dept. of Inf. Studies, Univ. of Sheffield, Shef. ENG.

Pollock et al., Auto. Spelling Correc. in Scientific & Scholarly Text, Communications of the ACM, vol. 27, #4, Apr. 1984, pp. 358-368.

Edwin Van Der Ham, Diag. & Resp. to Student Errors in a Dialogue-based . . . , Tech. Rep. UOCS-2005-06, Dept. of Comp. Science, Univ. of Otago, Otago, New Zealand, May 6, 2005, pp. 1-50.

* cited by examiner

*Primary Examiner*—Stephen S Hong
*Assistant Examiner*—Nicholas R Hasty
(74) *Attorney, Agent, or Firm*—Kraguljac & Kalnay, LLC

(57) ABSTRACT

Systems, methods, media, and other embodiments associated with (non)contiguous n-gram based spell correction are described. One exemplary system embodiment includes logic for creating contiguous and non-contiguous trigrams, logic for creating an inverted index relating trigrams and the words from which they were generated, and logic for comparing trigrams associated with a word to spell check to trigrams associated with the words selected using the inverted index.

16 Claims, 6 Drawing Sheets

SPELLING CORRECTION WITH LIAOALPHAGRAMS AND INVERTED INDEX

BACKGROUND

Computer based spelling correction has been practiced for quite some time. The spell-check features on word processors and the "did you mean?" spelling suggestions provided by search engines like GOOGLE are familiar tools. Traditional computer based spelling correction may be predicated on conventional techniques including common misspelling dictionaries, similarity keys, and so on. Some spelling-checking approaches may even employ conventional trigrams (sets of three contiguous characters) to facilitate suggesting spelling corrections. Conventional techniques may involve maximizing a similarity score or minimizing a string-to-string edit distance. However, these conventional techniques may be too processor intensive and/or time consuming to provide a timely, meaningful response in a real time query environment.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
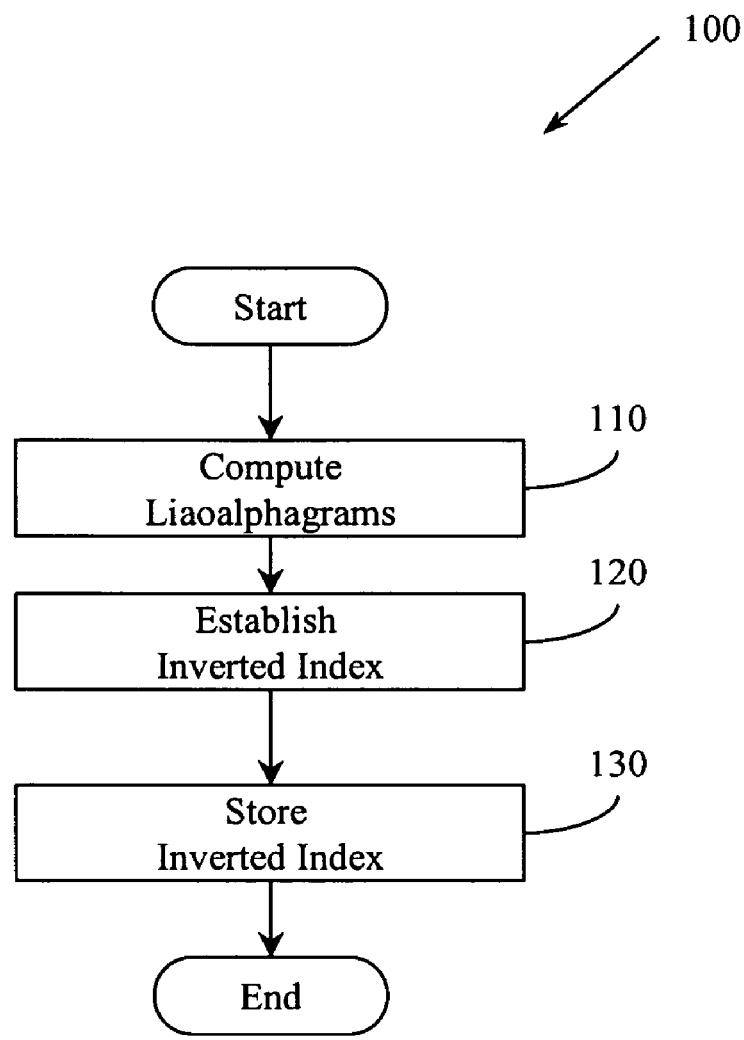
FIG. 1 illustrates an example method configured to support spelling correction with liaoalphagrams and an inverted index.

Example systems and methods concern liaoalphagram based spelling correction in a query environment. One example system includes logic for creating liaoalphagrams, which may contain both contiguous and selectively non-contiguous n-grams (e.g., tri-grams, four-grams). Conventional systems that use trigrams only process contiguous trigrams. The example system may also include logic for creating an inverted index that relates liaoalphagrams to words from which they were generated and to words in which they appear. With the words, liaoalphagrams, and inverted index available, the example system may include logic for comparing liaoalphagrams associated with a word to spell check to liaoalphagrams associated with the words reachable via the inverted index. The comparing may include, for example, analyzing the number of shared liaoalphagrams in light of the number of non-shared liaoalphagrams.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer communication", as used herein, refers to a communication between computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a storage medium that stores instructions and/or data that can be read by a computer. A computer-readable medium may take forms, including, but not limited to, non-volatile media (e.g., optical disk, magnetic disk), and volatile media (e.g., semiconductor memory, dynamic memory). Common forms of computer-readable mediums include floppy disks, hard disks, magnetic tapes, CD-ROMs, RAMs, ROMs, and so on.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, a disk, and so on. In different examples a data store may reside in one logical and/or physical entity and/or may be distributed between multiple logical and/or physical entities.

"Logic", as used herein, includes but is not limited to hardware, firmware, software embodied as computer executable instructions on a computer-readable storage medium and/or combinations thereof to perform a function(s) or an action(s), and/or to cause a function or action from another logic, method, and/or system. Logic may include a software controlled microprocessor, discrete logic (e.g., application specific integrated circuit (ASIC)), an analog circuit, a digital circuit, a programmed logic device, a memory device containing instructions, and so on. Logic may include a gate(s), a combinations of gates, other circuit components, and so on. Where multiple logical logics are described, it may be possible in some examples to incorporate the multiple logical logics into one physical logic. Similarly, where a single logical logic is described, it may be possible in some examples to distribute that single logical logic between multiple physical logics.

"Query", as used herein, refers to a semantic construction that facilitates gathering and processing information. A query may be formulated in a natural language, in a database query language like structured query language (SQL), an object query language (OQL), and so on. A query may be implemented in computer code (e.g., C#, C++, Javascript) for gathering information from various data stores and/or information sources.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more computer instructions and/or processor instructions that can be read, interpreted, compiled, and/or executed by a computer and/or processor. Software causes a computer, processor, or other electronic device to perform functions, actions and/or behave in a desired manner. Software may be embodied in various forms including routines, algorithms, modules, methods, threads, and/or programs. In different examples software may be embodied in separate applications and/or code from dynamically linked libraries. In different examples, software may be implemented in executable and/or loadable forms including, but not limited to, a stand-alone program, an object, a function (local and/or remote), a servelet, an applet, instructions stored in a memory, part of an operating system, and so on. In different examples, computer-readable and/or executable instructions may be located in one logic and/or distributed between multiple communicating, co-operating, and/or parallel processing logics and thus may be loaded and/or executed in serial, parallel, massively parallel and other manners.

Software suitable for implementing various components of example systems and methods described herein may be developed using programming languages and tools (e.g., Java, C, C#, C++, SQL, APIs, SDKs, assembler). Software, whether an entire system or a component of a system, may be embodied as an article of manufacture and maintained or provided as part of a computer-readable medium. Software may include signals that transmit program code to a recipient over a network or other communication medium.

"User", as used herein, includes but is not limited to, one or more persons, software, computers or other devices, or combinations of these.

Some portions of the detailed descriptions that follow are presented in terms of algorithm descriptions and representations of operations on electrical and/or magnetic signals capable of being stored, transferred, combined, compared, and otherwise manipulated in hardware. These are used by those skilled in the art to convey the substance of their work to others. An algorithm is here, and generally, conceived to be a sequence of operations that produce a result. The operations may include physical manipulations of physical quantities. The manipulations may produce a transitory physical change like that in an electromagnetic transmission signal.

It has proven convenient at times, principally for reasons of common usage, to refer to these electrical and/or magnetic signals as bits, values, elements, symbols, characters, terms, numbers, and so on. These and similar terms are associated with appropriate physical quantities and are merely convenient labels applied to these quantities. Unless specifically stated otherwise, it is appreciated that throughout the description, terms including processing, computing, calculating, determining, displaying, automatically performing an action, and so on, refer to actions and processes of a computer system, logic, processor, or similar electronic device that manipulates and transforms data represented as physical (electric, electronic, magnetic) quantities.

Example methods may be better appreciated with reference to flow diagrams. While for purposes of simplicity of explanation, the illustrated methods are shown and described as a series of blocks, it is to be appreciated that the methods are not limited by the order of the blocks, as some blocks can occur in different orders and/or concurrently with other blocks from that shown and described. Moreover, less than all the illustrated blocks may be required to implement an example method. In some examples, blocks may be combined, separated into multiple components, may employ additional, not illustrated blocks, and so on. In some examples, blocks may be implemented in logic. In other examples, processing blocks may represent functions and/or actions performed by functionally equivalent circuits (e.g., an analog circuit, a digital signal processor circuit, an application specific integrated circuit (ASIC)), or other logic device. Blocks may represent executable instructions that cause a computer, processor, and/or logic device to respond, to perform an action(s), to change states, and/or to make decisions. While the figures illustrate various actions occurring in serial, it is to be appreciated that in some examples various actions could occur concurrently, substantially in parallel, and/or at substantially different points in time.

FIG. 1 illustrates a method 100 configured to support spelling correction with liaoalphagrams and an inverted index. Method 100 may include, at 110, computing liaoalphagrams for correctly spelled words. A liaoalphagram differs from conventional trigrams or n-grams. A conventional trigram includes three contiguous characters from a word while a liaoalphagram may include both contiguous and selectively non-contiguous characters. For example, conventional trigrams associated with the word "rats" are limited to {rat ats}. However, three character liaoalphagrams associated with the word rats may include {rat ras ats} since a liaoalphagram may include both contiguous sets of characters and non-contiguous sets of characters. In a liaoalphagram a character may be skipped between neighboring characters as illustrated by skipping the t after a in rats to form the liaoalphagram "ras". By way of further illustration, three character n-grams for the word "nicks" are limited to {nic ick cks} while three character liaoalphagrams may include {nic nik nck ncs ick ics iks cks}. In a liaoalphagram a letter can be skipped between either the first pair of letters and/or the second pair of letters. By providing more n-grams and by providing n-grams that include sets of letters found in misspelled versions of a word, liaoalphagrams facilitate suggesting spelling corrections due to omitted letters and duplicated letters, both of which are common in query (e.g., search engine) environments when a user manually types in a query.

The set of correctly spelled words may be stored in and/or received from a data store. The data store may be, for example, a table in a relational database, a file in a file system, a disk, and so on. In different examples and for different applications the set of words may be generic (e.g., a standard dictionary) or may be tailored to a specific application (e.g., biochemistry). Receiving the set of words may include, for example, opening a file, establishing a connection to a database server, linking to a database table, receiving a file, receiving a computer communication, and so on.

In different examples, liaoalphagrams may have different lengths. For example, based on the average length of words in a set of words, the mean length of words in a set of words, and/or other measures, liaoalphagrams having three characters, four characters, and/or other lengths may be computed at 110. In some examples, a set of liaoalphagrams may include n-grams of different lengths and/or may include duplicate n-grams.

Method 100 may also include, at 120, establishing an inverted index that relates a liaoalphagram to a correctly spelled word(s). The inverted index may include a set of entries (e.g., records). The entries may be stored, for example, in an array, a database table, and so on. An entry may include a liaoalphagram and a set (e.g., list) of words in which that liaoalphagram appears. Therefore, given a liaoalphagram, a set of words in which the liaoalphagram appears can be retrieved. This may facilitate finding suggested spelling corrections for a misspelled query term. While a record is described for an entry, it is to be appreciated that the inverted index may be established using other entry types and data structures. Also, while a single inverted index is described, it is to be appreciated that in some examples multiple inverted indexes and/or blended inverted indexes may be created. For example, in a first example an inverted index populated with tri-gram liaoalphagrams may be created. In a second example, an inverted index populated with four-gram liaoalphagrams may be created. In another example, two inverted indexes, one with tri-gram liaoalphagrams and one with four-gram liaoalphagrams may be created while in yet another example an inverted index having both tri-gram liaoalphagrams and four-gram liaoalphagrams may be created. Conventional systems, to the extent they even create an inverted index, will only populate the index with single length n-grams. The different inverted indexes facilitate responding in a timely manner in a query environment (e.g., search engine) by providing searchable data structures relevant to a query environment determined by search term attributes and/or search target attributes.

Method 100 may also include, at 130, storing the inverted index. The inverted index may be stored, for example, in a data store, in a database, in a file, on a disk, in a memory, and so on. In one example, the correctly spelled words, the liaoalphagrams, and the inverted index may all be stored in a single data store. In other examples, the correctly spelled words, liaoalphagrams, and inverted index may be stored in separate data stores.

While FIG. 1 illustrates various actions occurring in serial, it is to be appreciated that various actions illustrated in FIG. 1 could occur substantially in parallel. By way of illustration, a first process could compute liaoalphagrams for correctly spelled words, a second process could establish an inverted index to relate liaoalphagrams to correctly spelled words, and a third process could store the inverted index. While three processes are described, it is to be appreciated that a greater and/or lesser number of processes could be employed and that lightweight processes, regular processes, threads, and other approaches could be employed.

Figure 2:
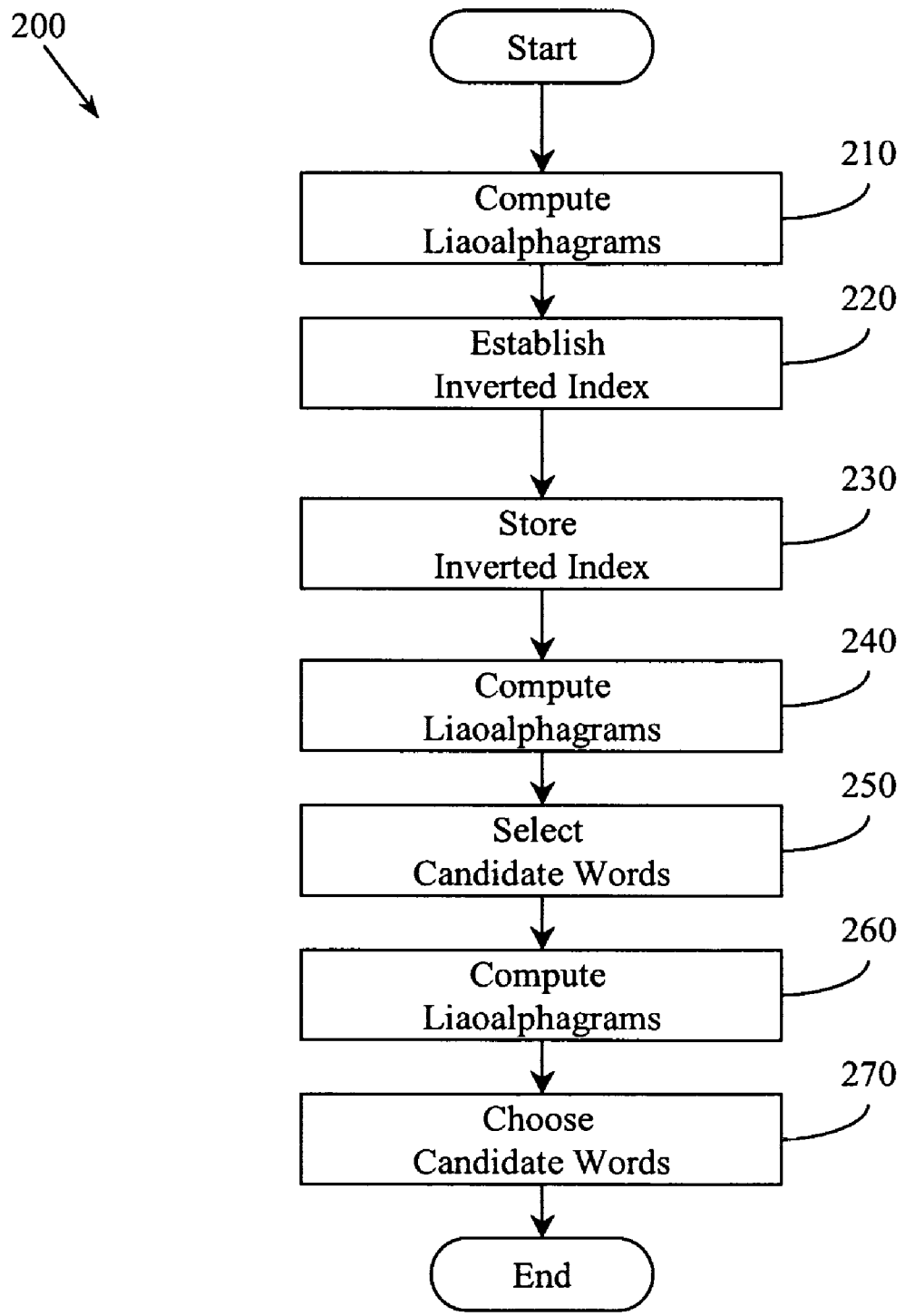
FIG. 2 illustrates an example method configured to perform spelling correction with liaoalphagrams and an inverted index.

FIG. 2 illustrates a method 200 configured to perform spelling correction with liaoalphagrams and an inverted index. Method 200 may include some actions for supporting spelling correction similar to those described in connection with method 100 (FIG. 1). For example, method 200 may include computing liaoalphagrams at 210, establishing an inverted index at 220, and storing an inverted index at 230. Method 200 may also include actions for doing the spelling checking and providing spelling suggestions.

For example, method 200 may include, at 240, computing liaoalphagrams for a query term. The query term may be received, for example, from a user interface associated with a search engine. The query term may be a word for which relevant documents are sought. If the query term is misspelled, it is unlikely that relevant documents can be found. Thus, before a search for documents is performed a determination may be made concerning whether the word is misspelled. If the word is misspelled, actions in method 200 may be employed to suggest spelling corrections. The liaoalphagrams may be stored, for example, as a set, a list, and so on.

The liaoaphagrams may be computed using the same approach as described in connection with method 100 (FIG. 1). Thus, the computed liaoalphagrams may include both contiguous and non-contiguous sets of letters from the query term. This facilitates accounting for omitted letters, which are a common spelling mistake in a query environment. In one example, method 200 may include determining whether the liaoalphagrams computed for the query term will contain tri-liaoalphagrams or four-liaoalphagrams based, at least in part, on the size of the query term. Similarly, method 200 may also include determining whether to access an inverted index having tri-liaoalphagrams and/or four-liaoalphagrams based, at least in part, on the size of the query term. To the extent, if at all, that conventional systems use n-grams, they may only process one size of n-gram.

After liaoalphagrams are computed for the query term, method 200 may include, at 250, selecting a candidate word using the inverted index. The candidate word may be selected to be analyzed as a potential spelling correction if the candidate word includes a liaoalphagram found in the liaoalphagrams computed for the query term. In some cases a single shared liaoalphagram may suffice to qualify a word for further analysis while in other cases multiple shared liaoalphagrams may be required.

With candidate words selected, method 200 may then proceed to compare the liaoalphagrams associated with the query term to liaoalphagrams associated with the candidate words. Therefore, method 200 may include, at 260, computing liaoalphagrams for candidate words. Recall that a candidate word is a word that shares at least one liaoalphagram with the query term. In one example, a candidate word may be selected if it shares at least a threshold number of liaoalphagrams with the query term. The threshold number may depend, for example, on the length of the query term, the average number of liaoalphagrams associated with words in the data store, and so on. The liaoalphagrams may be stored as sets, lists, and so on.

Method 200 may also include, at 270, choosing a candidate word(s) to present as a suggested spelling correction for the query term. The candidate word may be chosen based, at least in part, on the comparison of the liaoalphagrams associated with the query term to the liaoalphagrams associated with correctly spelled words. Comparing the liaoalphagrams associated with the query term to the liaoalphagrams associated with a candidate word may include computing a liaoalphagram similarity score. In different examples the liaoalphagram similarity score may be based on a Jaccard distance, on a Levenshtein distance, on a combination thereof, and so on. Which candidate word is presented as a suggested spelling for the query term may depend on a similarity ranking that is based on the liaoalphagram similarity score.

In one example, methods are implemented as processor executable instructions and/or operations stored on a computer-readable medium. Thus, in one example, a computer-readable medium may store processor executable instructions operable to perform a method that includes computing liaoalphagrams for correctly spelled words, establishing an inverted index that relates a liaoalphagram to a correctly spelled word(s) and then storing the inverted index. The method may also include computing liaoalphagrams for a query term. The method may also include using the inverted index to select correctly spelled words that include liaoalphagrams found in the query term. The method may also include choosing correctly spelled words to present as suggested spellings for the query term based on comparing liaoalphagrams for the query term to liaoalphagrams for correctly spelled words. While this method is described being stored on a computer-readable medium, it is to be appreciated that other example methods described herein may also be stored on a computer-readable medium.

An example of data structures created, similarly scores computed, and comparisons made will now be provided to illustrate an example of processing that may be performed by methods like method 100 and/or 200. Assume a set of correctly spelled words has two only terms: "rack" and "oracle". Assume that a query term to spell check is "oracl". Table 1 shows liaoalphagrams computed for the words and the query term.

TABLE 1

| Terms | Tri-liaoalphagrams |
| --- | --- |
| Rack | rac rac rck rak ack |
| Oracle | ora ora oac orc oal rac rcl ral rce acl ale ace cle |
| oracl | ora ora oac orc oal rac rcl ral acl |

Rules for computing the liaoalphagrams in Table 1 may include, (1) a tri-liaoalphagram includes three characters, (2) the order of three characters in a tri-liaoalphagram is the same as the order of the three characters in a word, (3) characters in a word can be the starting character of a tri-liaoalphagram so long as there are two characters following it to form a legal tri-liaoalphagram, (4) two contiguous characters in a tri-liaoalphagram must appear in the original term either contiguously or with only one other intervening character, and (5) a legal tri-liaoalphagram formed from the first three characters in a word appears twice in a set of tri-grams. It is to be appreciated that different sets of rules may be used to compute different sets of different liaoalphagrams. For example, different rules concerning missing intervening characters, duplicated characters, duplicated trigrams, and so on may be employed.

Rule 4 describes tri-grams that skip a character in the original word. This facilitates addressing situations including the word being spell checked missing a character and/or the word being spell checked having an additional (e.g., duplicate) character. Rule 5 describes a heuristic that assumes that misspellings rarely involve the first letter in a word.

Table 2 illustrates an inverted index built from terms in table 1. Bold faced tri-liaoalphagrams are found in two or more of the words and/or the query term.

TABLE 2

| Tri-liaoalphagram | Term list |
| --- | --- |
| Rac | rack, oracle |
| Rck | rack |
| Rak | rack |
| Ack | rack |
| Ora | oracle |
| Oac | oracle |
| Orc | oracle |
| Oal | oracle |
| Rcl | oracle |
| Ral | oracle |
| Rce | oracle |
| Acl | oracle |
| Ale | oracle |
| Ace | oracle |
| Cle | oracle |

The inverted index in table two is not sorted. It is to be appreciated that the inverted index could be sorted, for example, alphabetically to facilitate improving search performance. When the query term "oracl" is found to be misspelled, it is decomposed into a set of tri-liaoalphagrams (e.g., a list) as illustrated in the third row of table 1. Tri-liaoalphagrams from the query tri-liaoalphagram list are used to access the inverted index in table 2. Words found to share at least one tri-liaoalphagram with "oracl" are then considered as potential correct spellings for "oracle". The number of shared tri-liaoalphagrams is computed for the potential correct spellings. In the example, where "oracl" is the query term, "oracle" matches nine tri-liaoalphagrams with "oracl" while "rack" matches two tri-liaoalphagrams with "oracl". A Jaccard similarity for these two candidate words may then computed. In one example, the similarity ("oracle", "oracl")= 9/(13+9−9)=9/13, where the number of tri-grams for "oracle" is 13 and the number of tri-grams for "oracl" is 9. In the example, the similarity ("rack", "oracl")=2/(9+5−2)=2/12. From these computations, it can be seen that "oracle" rather than "rack" will be suggested as the correct spelling for misspelled term "oracl".

Figure 3:
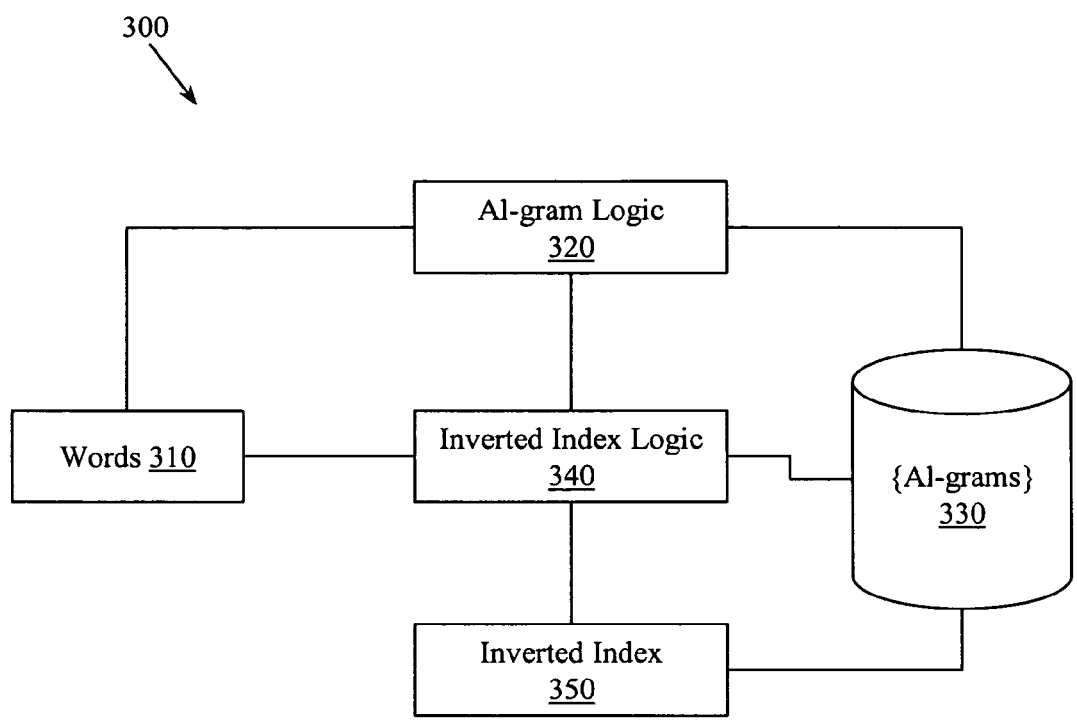
FIG. 3 illustrates an example system configured to support spelling correction with al-grams and an inverted index.

FIG. 3 illustrates a system 300 configured to support spelling correction with al-grams and an inverted index. System 300 may receive correctly spelled words 310. These words may be generic (e.g., general purpose dictionary), may be specific to an application (e.g., mountain climbing), and so on. Words 310 may be stored, for example, in a table, a disk, a database, and so on.

System 300 may include an al-gram logic 320 that is configured to receive a word and to output a set of al-grams for the word. An al-gram is an n-gram that may include contiguous sets of letters and sets of letters with one or more omitted letters. Al-gram logic 320 may receive a word 310, compute al-grams for the word, and then store a set 330 of al-grams. While a set 330 of al-grams is described, it is to be appreciated that the al-grams may be arranged and/or stored in various configuration in different data structures.

System 300 may also include an inverted index logic 340 that is configured to compute an inverted index 350 that relates an al-gram to a word(s) 310 in which the al-gram appears. One al-gram may appear in one or more words and a word may have one or more al-grams. By way of illustration of the operation of system 300, al-gram logic 320 may receive words 310. Al-gram logic 320 may compute sets 330 of al-grams for these words. Inverted index logic 340 may then create inverted index 350 to relate al-grams computed for the words 310 to one or more words in which the al-grams appear. Having inverted index 350 facilitates identifying words 310 that may be analyzed with respect to whether they are good suggestions for correcting a misspelled word. While al-gram logic 320 and inverted index logic 340 are illustrated as separate components, it is to be appreciated that in some examples al-gram logic 320 and inverted index logic 340 may be implemented in a single logic. Similarly, while inverted index 350 is illustrated separate from a data store in which sets 330 of al-grams are stored, it is to be appreciated that in some examples sets 330 of al-grams and/or inverted index 350 may be stored in the same data store.

Figure 4:
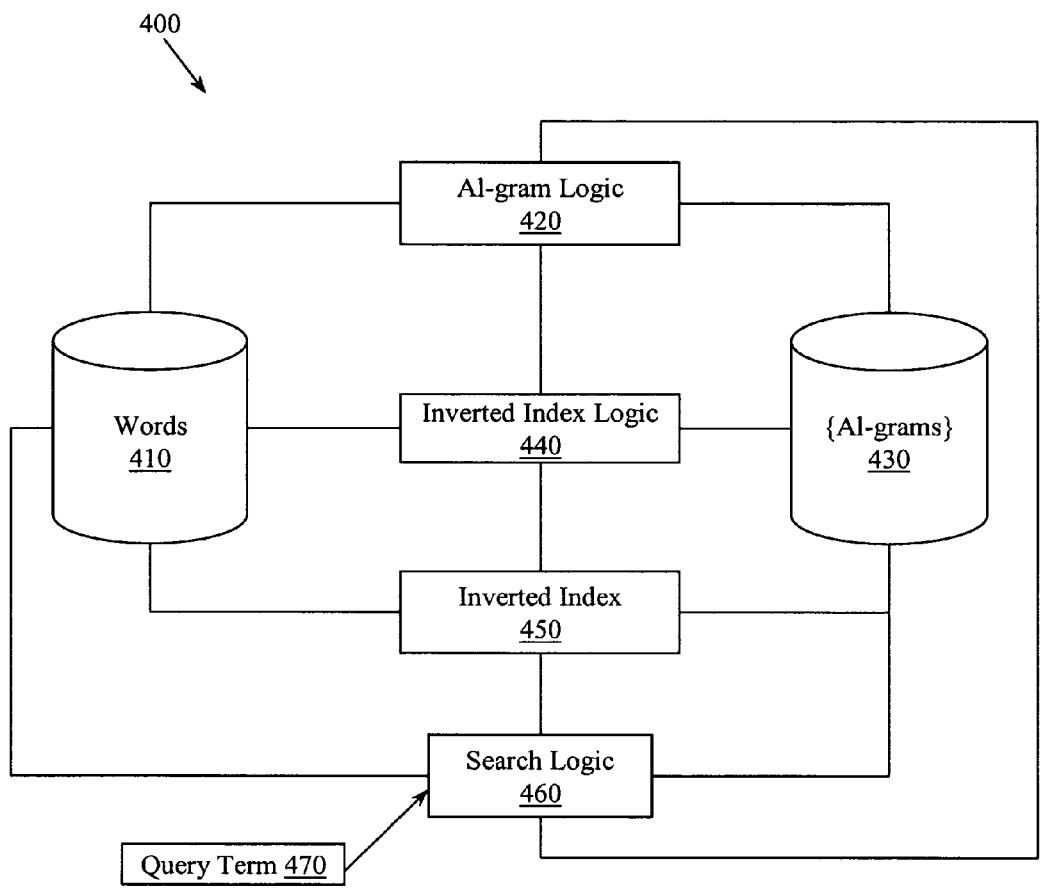
FIG. 4 illustrates an example system configured to perform spelling correction with al-grams and an inverted index.

FIG. 4 illustrates a system 400 that is configured to perform spelling correction with al-grams and an inverted index. System 400 includes some elements that are similar to those described in connection with system 300 (FIG. 3). For example, system 400 includes a source (e.g., data store 410) from which words may be provided to other logics. System 400 may also include an al-gram logic 420 configured to produce sets 430 of al-grams. Similarly, system 400 includes an inverted index logic 440 configured to produce an inverted index 450 that relates al-grams to words.

Additionally, system 400 may include other elements for performing spelling correction. These elements may include a search logic 460 that is configured to receive a search word (e.g., query term 470). The search word may be received, for example, from a user interface associated with a search engine. Before the search engine searches for documents related to the search word, a determination may be made concerning the likelihood that the search word is misspelled. If it is likely that the word is misspelled, then system 400 may accept as input the search word and may produce as output a suggestion(s) for a correctly spelled version of the search word.

Thus, al-gram logic 420 may be configured to compute a set of al-grams for the search word. With these al-grams for the search word available, the search logic 460 may identify words that may be interesting to evaluate with respect to being a correctly spelled version of the query term. Search logic 460 may use the inverted index and the al-grams computed for the search word to select the interesting words.

The search logic 460 may also be configured to compare the al-grams computed for the search word to al-grams associated with the interesting word(s). A word may be selected when it shares at least one al-gram with the search word. More than one word may share an al-gram with the search word. Thus, search logic 460 may analyze several words, several hundred words, several thousand words, or even more. Clearly not all these words will be good suggestions for a corrected version of a misspelled word. Therefore, search logic 460 may be configured to select analyzed words that receive a similarity score exceeding a threshold, to select the words that receive a highest similarity score, and so on.

A similarity score may be based, for example, on the results of comparing al-grams computed for the search word to al-grams computed for selected interesting words. In one example, the search logic 460 may compute the similarity score based a Jaccard distance, a Levenshtein edit distance, and/or a combination thereof. In this way, more relevant (e.g., more likely) spellings for the misspelled search word may be provided.

Figure 5:
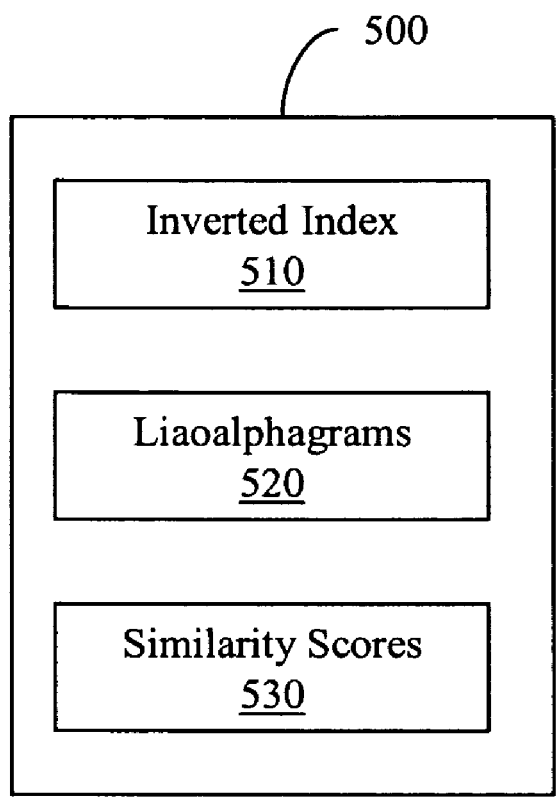
FIG. 5 illustrates an example data structure configured to support spelling correction with (non)contiguous n-grams and an inverted index.

FIG. 5 illustrates a data structure 500 associated with spelling correction with liaoalphagrams and an inverted index. Data structure 500 may take different forms including, for example, a record, a table, a file, and so on. Data structure 500 includes a first field 510 that stores data representing an inverted index. While a "field" is described, it is to be appreciated that field 510 may itself be a record, a list, a tree, and other data structures. The inverted index may relate liaoalphagrams to words from which the liaoalphagrams were extracted. Thus the inverted index may facilitate locating words related to a word whose spelling is being corrected.

Data structure 500 may also include a second field 520 configured to store liaoalphagrams extracted from a word to be spell-corrected. This word may have been received, for example, in a query, as an input to a search engine, and so on. Data structure 500 may also include a third field 530 configured to store similarity scores. The similarly scores may describe how similar a spell-correction candidate is to a word to be spell-corrected. The similarity score may be computed from a ratio of how many liaoalphagrams are shared between a spell-correction candidate and a word to be spell-corrected.

Figure 6:
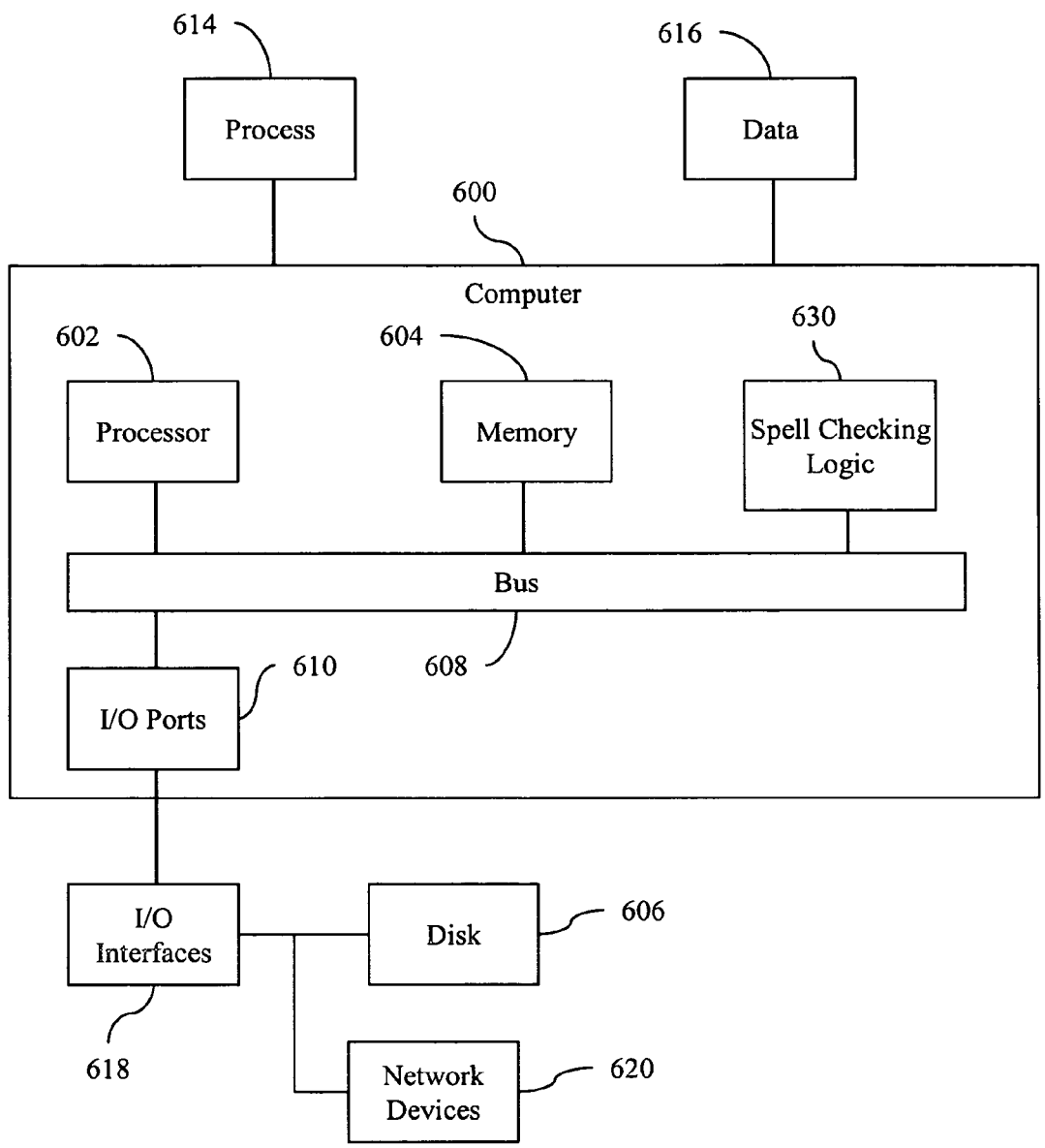
FIG. 6 illustrates an example computing environment in which example systems and methods described herein can operate.

FIG. 6 illustrates a computing device 600 in which example systems and methods described herein, and equivalents, may operate. The example computing device may be a computer 600 that includes a processor 602, a memory 604, and input/output ports 610 operably connected by a bus 608. In one example, computer 600 may include a spelling correction logic 630 configured to facilitate correcting words in a query environment. In different examples, logic 630 may be implemented in hardware, software embodied as computer executable instructions on a computer-readable storage medium, firmware, and/or combinations thereof. Thus, logic 630 may provide means (e.g., hardware, software embodied as computer executable instructions on a computer-readable storage medium, firmware) for computing contiguous and non-contiguous trigrams for words. Logic 630 may also provide means (e.g., hardware, embodied as computer executable instructions on a computer-readable storage medium, firmware) for creating an inverted index configured to relate the contiguous and non-contiguous trigrams to words. Logic 630 may also provide means (e.g., hardware, embodied as computer executable instructions on a computer-readable storage medium, firmware) for computing contiguous and non-contiguous trigrams for a potentially misspelled word provided in a query to a search engine. In one example, logic 630 may also include means for ranking words with respect to how likely the words are correct spellings for the potentially misspelled word. The likelihood may be based on comparing contiguous and non-contiguous trigrams for the potentially misspelled word to contiguous and non-contiguous trigrams associated with known correctly spelled words. While logic 630 is illustrated as a hardware component attached to bus 608, it is to be appreciated that in one example logic 630 could be implemented in processor 602.

Generally describing an example configuration of computer 600, processor 602 may be a variety of various processors including dual microprocessor and other multi-processor architectures. Memory 604 may include volatile memory and/or non-volatile memory. Non-volatile memory may include, for example, ROM, PROM, EPROM, and EEPROM. Volatile memory may include, for example, RAM, synchronous RAM (SRAM), dynamic RAM (DRAM), synchronous DRAM (SDRAM), double data rate SDRAM (DDR SDRAM), and direct RAM bus RAM (DRRAM).

Disk 606 may be operably connected to the computer 600 via, for example, an input/output interface (e.g., card, device) 618 and an input/output port 610. Disk 606 may be, for example, a magnetic disk drive, a solid state disk drive, a floppy disk drive, a tape drive, a Zip drive, a flash memory card, and/or a memory stick. Furthermore, disk 606 may be a CD-ROM, a CD recordable drive (CD-R drive), a CD rewriteable drive (CD-RW drive), and/or a digital video ROM drive (DVD ROM). Memory 604 can store processes 614 and/or data 616, for example. Disk 606 and/or memory 604 can store an operating system that controls and allocates resources of computer 600.

Bus 608 may be a single internal bus interconnect architecture and/or other bus or mesh architectures. While a single bus is illustrated, it is to be appreciated that computer 600 may communicate with various devices, logics, and peripherals using other busses (e.g., PCIE, SATA, Infiniband, 1394, USB, Ethernet). Bus 608 can be types including, for example, a memory bus, a memory controller, a peripheral bus, an external bus, a crossbar switch, and/or a local bus. The local bus may be, for example, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

Computer 600 may interact with input/output devices via i/o interfaces 618 and input/output ports 610. Input/output devices may be, for example, a keyboard, a microphone, a pointing and selection device, cameras, video cards, displays, disk 606, network devices 620, and so on. Input/output ports 610 may include, for example, serial ports, parallel ports, and USB ports.

Computer 600 can operate in a network environment and thus may be connected to network devices 620 via i/o interfaces 618, and/or i/o ports 610. Through the network devices 620, computer 600 may interact with a network. Through the network, computer 600 may be logically connected to remote computers. Networks with which computer 600 may interact include, but are not limited to, a local area network (LAN), a wide area network (WAN), and other networks. In different examples, network devices 620 may connect to LAN technologies including, for example, fiber distributed data interface (FDDI), copper distributed data interface (CDDI), Ethernet (IEEE 802.3), token ring (IEEE 802.5), wireless computer communication (IEEE 802.11), and Bluetooth (IEEE 802.15.1). Similarly, network devices 620 may connect to WAN technologies including, for example, point to point links, circuit switching networks (e.g., integrated services digital networks (ISDN)), packet switching networks, and digital subscriber lines (DSL).

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A method, comprising:
    determining, with a processor, a number of characters to include in a liaoalphagram based on one or more of, an average size of words in a set of correctly spelled words, a mean size of words in the set of correctly spelled words, and a uniqueness measurement that compares uniqueness for tri-liaoalphagrams computed from the set of correctly spelled words to uniqueness for four-liaoalphagrams computed from the set of correctly spelled words;
    computing a set of liaoalphagrams having the determined number of characters for the set of correctly spelled words, where the set of liaoalphagrams includes at least one liaoalphagram having at least three selectively non-contiguous characters;
    establishing an inverted index that relates a member of the set of liaoalphagrams to one or more correctly spelled words; and
    storing the inverted index.

2. A method, comprising:
    computing, with a processor, a set of liaoalphagrams for a set of correctly spelled words, where the set of liaoalphagrams includes at least one liaoalphagram having at least three selectively non-contiguous characters;
    establishing an inverted index that relates a member of the set of liaoalphagrams to one or more correctly spelled words;
    storing the inverted index;
    computing one or more query term liaoalphagrams for a query term, where the one or more query term liaoalphagrams includes at least one liaoalphagram having at least three selectively non-contiguous characters;
    selecting one or more candidate correctly spelled words using the inverted index and the one or more query term liaoalphagrams, where a candidate correctly spelled word is selected if the candidate correctly spelled word includes a liaoalphagram found in the one or more query term liaoalphagrams computed for the query term;
    computing sets of candidate word liaoalphagrams for the one or more candidate correctly spelled words; and
    choosing one or more candidate correctly spelled words to present as suggested spellings for the query term based, at least in part, on comparing the set of query term liaoalphagrams computed for the query term to the sets of candidate word liaoalphagrams computed for the one or more candidate correctly spelled words and determining a number of liaoalphagrams that are present in both sets of liaoalphagrams;
    where the set of liaoalphagrams computed for the query term includes two copies of a contiguous liaoalphagram computed from the first three letters of the query term and where a set of candidate word liaoalphagrams computed for the candidate correctly spelled words include two copies of a contiguous liaoalphagram computed from the first three letters of the candidate correctly spelled word.

3. The method of claim 2, where a candidate correctly spelled word is selected if it shares at least a threshold number of liaoalphagrams with the query term.

4. The method of claim 2, where comparing the set of liaoalphagrams associated with the query term to the sets of liaoalphagrams associated with the candidate correctly spelled words includes computing a liaoalphagram similarity score.

5. The method of claim 4, the liaoalphagram similarity score being based, at least in part, on a Jaccard distance.

6. The method of claim 4, the liaoalphagram similarity score being based on a combination of a Jaccard distance and a Levenshtein distance.

7. The method of claim 4, where choosing a candidate correctly spelled word to present as a suggested spelling for the query term depends on a similarity ranking that is based, at least in part, on the liaoalphagram similarity score.

8. A method, comprising:
    computing, with a processor, a set of liaoalphagrams for correctly spelled words, where the liaoalphagrams include at least one liaoalphagram having at least three selectively non-contiguous characters;
    establishing an inverted index that relates a member of the set of liaoalphagrams to a correctly spelled word;
    storing the inverted index;
    determining whether a set of query term liaoalphagrams associated with a query term will contain tri-liaoalphagrams or four-liaoalphagrams based, at least in part, on the size of a query term;
    computing the set of query term liaoalphagrams for the query term;
    selecting one or more candidate correctly spelled words using the inverted index and the query term liaoalphagrams, where a candidate correctly spelled word is selected if the candidate correctly spelled word includes a liaoalphagram found in the set of query term liaoalphagrams computed for the query term; and
    choosing one or more candidate correctly spelled words to present as suggested spellings for the query term based, at least in part, on comparing the set of liaoalphagrams to the set of query term liaoalphagrams.

13

9. A computer-readable medium storing processor executable instructions operable to perform a method, the method comprising:

determining the number of characters to include in a liaoalphagram based on one or more of, an average size of words in a set of correctly spelled words, a mean size of words in a set of correctly spelled words, and a uniqueness measurement that compares uniqueness for tri-liaoalphagrams computed from a set of correctly spelled words to uniqueness for four-liaoalphagrams computed from a set of correctly spelled words;

computing liaoalphagrams for correctly spelled words;

establishing an inverted index that relates a liaoalphagram to a correctly spelled word;

storing the inverted index;

determining whether a first list of liaoalphagrams associated with a query term and one or more second lists of liaoalphagrams associated with correctly spelled words will contain tri-liaoalphagrams or four-liaoalphagrams based, at least in part, on the size of the query term;

computing the first list of liaoalphagrams for the query term;

selecting one or more candidate words from the set of correctly spelled words using the inverted index, where a candidate word is selected if the candidate word includes a liaoalphagram found in the first list of liaoalphagrams;

computing one or more second lists of liaoalphagrams for the one or more candidate words; and choosing one or more candidate words to present as suggested spellings for the query term based, at least in part, on comparing the first list of liaoalphagrams to second lists of liaoalphagrams, where comparing the first list of liaoalphagrams to the second lists of liaoalphagrams includes computing a liaoalphagram similarity score based, at least in part, on a combination of a Jaccard distance and a Levenshtein distance, where the first list of liaoalphagrams includes two copies of a contiguous liaoalphagram computed from the first three letters of the query term and where a second list of liaoalphagrams includes two copies of a contiguous liaoalphagram computed from the first three letters of a candidate word associated with the second list.

10. A computer-readable medium storing processor executable instructions operable to perform a method, the method comprising:

computing liaoalphagrams for correctly spelled words; where the liaoalphagrams include at least one liaoalphagram having at least three selectively non-contiguous characters;

establishing an inverted index that relates a liaoalphagram to a correctly spelled word;

storing the inverted index;

determining whether a list of query term liaoalphagrams associated with a query term will contain tri-liaoalphagrams or four-liaoalphagrams based, at least in part, on the size of a query term;

computing the list of query term liaoalphagrams for the query term; where the first list of query term liaoalphagrams includes at least one liaoalphagram having at least three selectively non-contiguous characters;

selecting one or more candidate correctly spelled words using the inverted index, where a candidate word is selected if the candidate word includes a liaoalphagram found in the list of query term liaoalphagrams; and choosing one or more candidate words to present as suggested spellings for the query term based, at least in part, on comparing the first list of query term liaoalphagrams to the liaoalphagrams for candidate words.

11. A system, comprising:

an al-gram logic configured to compute a set of al-grams having at least one al-gram composed of three selectively non-contiguous characters, for a correctly spelled word in a set of correctly spelled words, where the al-gram logic is configured to determine the number of characters to include in an al-gram based on one or more of, an average size of words in the set of correctly spelled words, a mean size of words in the set of correctly spelled words, and a uniqueness measurement that compares uniqueness for an al-gram having three characters computed from the set of correctly spelled words to uniqueness for an al-gram having four characters computed from the set of correctly spelled words;

a data store that stores the computed al-grams for processes related to spell checking; and an inverted index logic configured to compute an inverted index that relates an al-gram to one or more correctly spelled words.

12. A system, comprising:

an al-gram logic configured to compute a set of al-grams having at least one al-gram composed of three selectively non-contiguous characters for a correctly spelled word;

a data store that stores the computed al-grams for processes related to spell checking;

an inverted index logic configured to compute an inverted index that relates an al-gram to one or more correctly spelled words;

a search logic configured to receive a search word;

the al-gram logic configured to compute a set of search word al-grams where the set of search word al-grams include at least one al-gram having at least three selectively non-contiguous characters, for the search word;

the search logic being configured to select one or more candidate words based, at least in part, on comparing the set of al-grams to set of search word al-grams and to compute a set of candidate word al-grams for respective selected candidate words; and where the set of search word al-grams includes two copies of a contiguous liaoalphagram computed from the first three letters of the search word and where the set of candidate word al-grams includes two copies of a contiguous liaoalphagram computed from the first three letters of the candidate word; and where the search logic is configured to select one or more candidate words as suggested spellings for the query term, based at least in part on a number of common al-grams in the set of search word al-grams and the sets of candidate word al-grams.

13. The system of claim 12, the search logic being configured to select candidate correctly spelled words that receive a similarity score exceeding a threshold, the search logic being configured to compute the similarity score based, at least in part, on comparing the first set of al-grams to the set of search word al-grams.

14. The system of claim 13, the search logic being configured to compute the similarity score based on one or more of, a Jaccard distance, and a Levenshtein edit distance.

15. A search engine system, comprising:
a search logic configured to receive a search word;
an al-gram logic configured to determine whether to compute tri-al-grams or four-al-grams based, at least in part, on the size of the search word, compute a first set of al-grams that includes at least one al-gram having at least three selectively non-contiguous characters for a correctly spelled word, the al-gram logic being configured to compute a second set of al-grams, that includes at least one al-gram having at least three selectively non-contiguous characters, for the search word;
a data store that stores the computed al-grams; and
an inverted index logic configured to compute an inverted index that relates an al-gram to one or more correctly spelled words;
the search logic being configured to identify, using the inverted index, the first set of al-grams, and the second set of al-grams, a spelling correction suggestion for the search word, the spelling correction suggestion being selected when the spelling correction suggestion word and the search word share at least one al-gram.

16. A computer-readable medium storing processor executable instructions operable to perform a method, the method comprising:
computing a set of liaoalphagrams for a set of correctly spelled words, where the set of liaoalphagrams includes at least one liaoalphagram having at least three selectively non-contiguous characters, where determining the number of characters to include in a liaoalphagram based on one or more of, an average size of words in the set of correctly spelled words, a mean size of words in the set of correctly spelled words, and a uniqueness measurement that compares uniqueness for tri-liaoalphagrams computed from the set of correctly spelled words to uniqueness for four-liaoalphagrams computed from the set of correctly spelled words;
establishing an inverted index that relates a member of the set of liaoalphagrams to one or more correctly spelled words; and
storing the inverted index.

* * * * *

UNITED STATES PATENT AND TRADEMARK OFFICE
CERTIFICATE OF CORRECTION

PATENT NO. : 7,856,598 B2  
APPLICATION NO. : 11/481750  
DATED : December 21, 2010  
INVENTOR(S) : Ciya Liao et al.

Page 1 of 1

It is certified that error appears in the above-identified patent and that said Letters Patent is hereby corrected as shown below:

In column 10, line 3, after "hardware," insert -- software --.

In column 10, line 7, after "hardware," insert -- software --.

Signed and Sealed this
Twenty-seventh Day of September, 2011

David J. Kappos
*Director of the United States Patent and Trademark Office*